US012037974B2

(12) United States Patent
Tagawa et al.

(10) Patent No.: US 12,037,974 B2
(45) Date of Patent: Jul. 16, 2024

(54) MANUFACTURING METHOD FOR HYDROELECTRIC POWER GENERATION SYSTEM

(71) Applicant: TOYOTA JIDOSHA KABUSHIKI KAISHA, Toyota (JP)

(72) Inventors: Yohsuke Tagawa, Nagoya (JP); Michinobu Suzuki, Toyota (JP); Satoru Katoh, Nisshin (JP); Naoyuki Miyara, Nagoya (JP); Tomonori Ogura, Toyota (JP); Ryuichi Tsutsumi, Toyota (JP); Yukihiko Ideshio, Nisshin (JP); Yoshihiro Taniyama, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 11 days.

(21) Appl. No.: 17/994,469

(22) Filed: Nov. 28, 2022

(65) Prior Publication Data

US 2023/0228243 A1 Jul. 20, 2023

(30) Foreign Application Priority Data

Jan. 14, 2022 (JP) ................................ 2022-004290

(51) Int. Cl.
*F03B 17/06* (2006.01)

(52) U.S. Cl.
CPC ....... *F03B 17/063* (2013.01); *Y10T 29/49716* (2015.01)

(58) Field of Classification Search
CPC ......................... Y10T 29/49716; F03B 17/063
See application file for complete search history.

(56) References Cited

U.S. PATENT DOCUMENTS

| | | | | |
|---|---|---|---|---|
| 9,960,612 | B2 * | 5/2018 | Ono | B60L 55/00 |
| 10,150,579 | B2 * | 12/2018 | James | H01R 27/02 |
| 10,272,900 | B2 * | 4/2019 | Kaneko | F02D 29/00 |
| 2018/0010491 | A1 | 1/2018 | Yamahata et al. | |

FOREIGN PATENT DOCUMENTS

| | | | |
|---|---|---|---|
| JP | 2008-101574 | A | 5/2008 |
| JP | 2010-239715 | A | 10/2010 |
| JP | 2018-008559 | A | 1/2018 |
| JP | 2021-072761 | A | 5/2021 |

OTHER PUBLICATIONS

English Machine Translation JP2018008559A (Year: 2018).*
Lowering the cost of small hydropower generation using used Prius parts, Nikkei Crosstech (xTECH), Feb. 28, 2019, https://xtech.nikkei.com/dm/atcl/news/16/022812012/.
Translation of Nov. 21, 2023 Office Action issued in Japanese Patent Application No. 2022-004290.

* cited by examiner

*Primary Examiner* — Sarang Afzali
(74) *Attorney, Agent, or Firm* — Oliff PLC

(57) ABSTRACT

A manufacturing method for a hydroelectric power generation system includes removing a transaxle including a first motor generator from an end-of-life hybrid electric vehicle, and assembling a hydraulic turbine to a rotary shaft coupled to the first motor generator in the removed transaxle. The rotary shaft to which the hydraulic turbine is assembled may be an engine shaft connected to an engine of the hybrid electric vehicle when the transaxle is mounted on the hybrid electric vehicle.

9 Claims, 3 Drawing Sheets

MANUFACTURING METHOD FOR HYDROELECTRIC POWER GENERATION SYSTEM

CROSS-REFERENCE TO RELATED APPLICATION

This application claims priority to Japanese Patent Application No. 2022-004290 filed on Jan. 14, 2022, incorporated herein by reference in its entirety.

BACKGROUND

1. Technical Field

A technology disclosed in the specification relates to a manufacturing method for a hydroelectric power generation system.

2. Description of Related Art

Japanese Unexamined Patent Application Publication No. 2008-101574 (JP 2008-101574 A) describes a hydroelectric power generation system. In this hydroelectric power generation system, an alternator for a vehicle is used as a generator.

SUMMARY

As in the case of the above-described technology, reusing components mounted on a vehicle to be scrapped, as part of a hydroelectric power generation system leads to effective use of resources. The specification provides a technology for promoting such an approach to achieve sustainable society.

A technology disclosed in the specification relates to a manufacturing method for a hydroelectric power generation system. The manufacturing method includes removing a transaxle including a first motor generator from an end-of-life hybrid electric vehicle, and assembling a hydraulic turbine to a rotary shaft coupled to the first motor generator in the removed transaxle.

With the manufacturing method, a transaxle mounted on a hybrid electric vehicle to be scrapped is able to be reused as part of a hydroelectric power generation system. In recent years, with proliferation of hybrid electric vehicles, the number of hybrid electric vehicles to be scrapped has also been increasing. Therefore, among various vehicles to be scrapped, particularly reusing components of hybrid electric vehicles has a significant meaning in effective use of resources. Also, in hybrid electric vehicles to be scrapped, particularly, transaxles mostly can sufficiently function over a long period of time. By reusing such transaxles, hydroelectric power generation systems can be provided at low cost, so it is possible to promote further proliferation of renewable energy.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
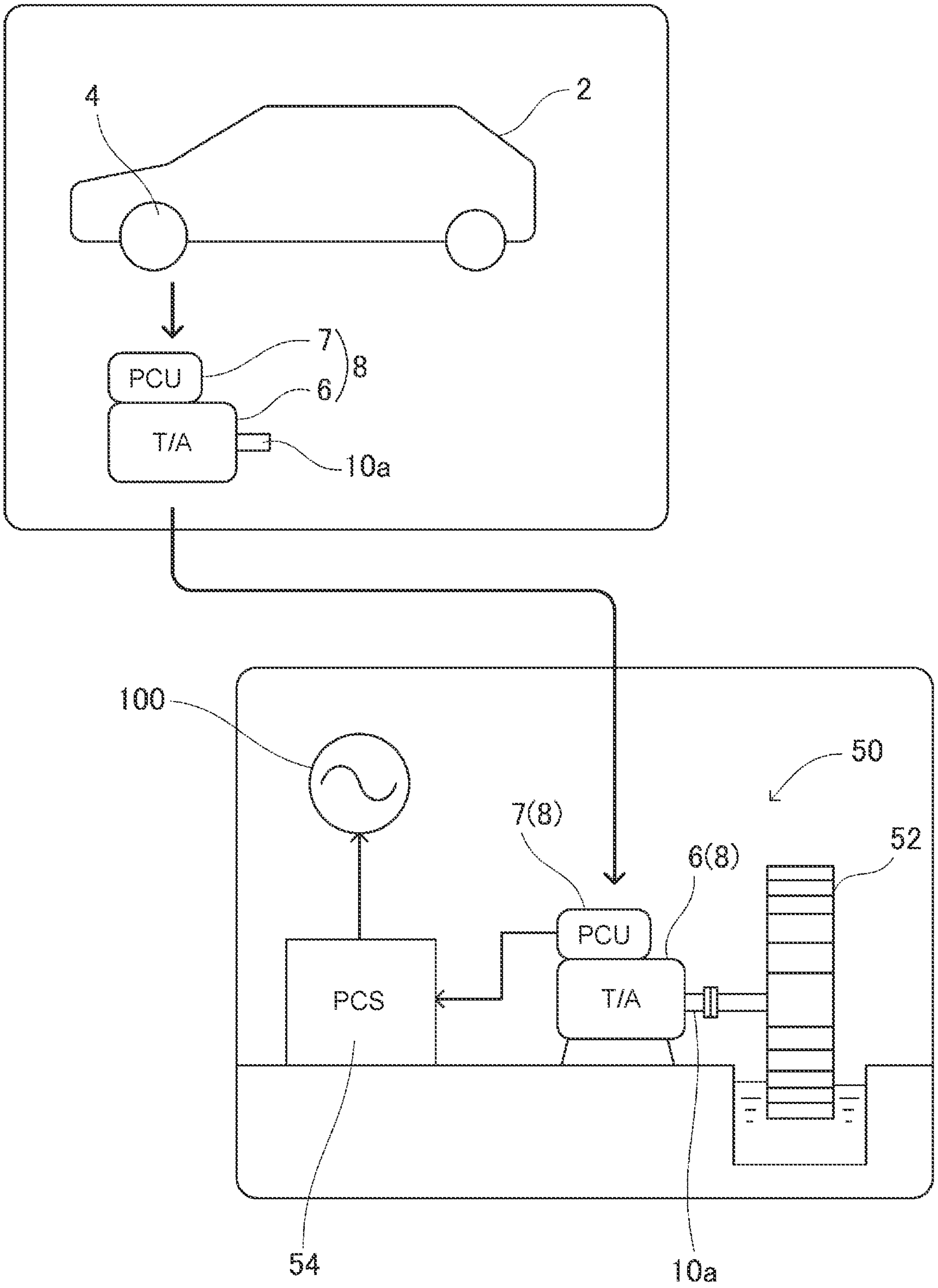
FIG. 1 is a diagram that schematically shows a state where a hybrid unit of a hybrid electric vehicle is reused as part of a hydroelectric power generation system.

In one embodiment of the technology, the rotary shaft of the transaxle may be an engine shaft connected to an engine of the hybrid electric vehicle when the transaxle is mounted on the hybrid electric vehicle. With such a configuration; as in the case of power generation using an engine in a hybrid electric vehicle, it is possible to efficiently generate electricity by rotation of a hydraulic turbine in a hydroelectric power generation system. In another embodiment, the rotary shaft of the transaxle may be a wheel shaft connected to a wheel when the transaxle is mounted on the hybrid electric vehicle.

In one embodiment of the technology, the transaxle may further include a planetary gear train. In this case, the rotary shaft of the transaxle may be connected to the first motor generator via the planetary gear train.

In the above-described embodiment, the transaxle may further include a second motor generator. In this case, the rotary shaft of the transaxle may be connected to the second motor generator via the planetary gear train. With such a configuration, the hydroelectric power generation system is able to generate electricity by using two motor generators. However, when the transaxle includes two motor generators as well, the hydroelectric power generation system may generate electricity by using only one of the motor generators.

In the above-described embodiment, the planetary gear train may include a sun gear connected to the first motor generator, a plurality of planetary gears meshed with the sun gear, a planetary carrier supporting, the plurality of planetary gears and connected to the rotary shaft, and an outer ring gear meshed with the plurality of planetary gears and connected to the second motor generator.

In the above-described embodiment, the transaxle may further include a parking lock configured to disable rotation of the outer ring gear. With such a configuration, when the hydroelectric power generation system generates electricity, the parking lock is able to be activated to limit components that operate inside the transaxle. Thus, it is possible to reduce energy loss in the transaxle. It is also possible to suppress the degradation of the transaxle.

In one embodiment of the technology, the transaxle may further include an oil pump configured to be driven by rotation of the rotary shaft. With such a configuration, when the hydroelectric power generation system generates electricity, it is possible to circulate lubricating oil in the transaxle with the oil pump.

In one embodiment of the technology, the transaxle may further include a power control unit connected to the first motor generator. In this case, the manufacturing method may further include connecting the power control unit to a power conditioner or an electrical storage device. With such a configuration, a power control unit prepared for a hybrid electric vehicle is able to be effectively used in a hydroelectric power generation system.

In the above-described embodiment, the power control unit may include an inverter, and a DC-DC converter connected to the first motor generator via the inverter. In this case, in the connecting, the first motor generator may be connected to the power conditioner or the electrical storage device without intervening the DC-DC converter. With such a configuration, it is possible to directly supply electric power generated by the first motor generator from the inverter to the power conditioner or the electrical storage device, so useless energy loss is avoided.

In the above-described embodiment, in the connecting, wiring may be performed by using a service hole provided in a housing of the power control unit. With such a configuration, it is possible to perform necessary wiring without additional working on the transaxle.

Figure 2:
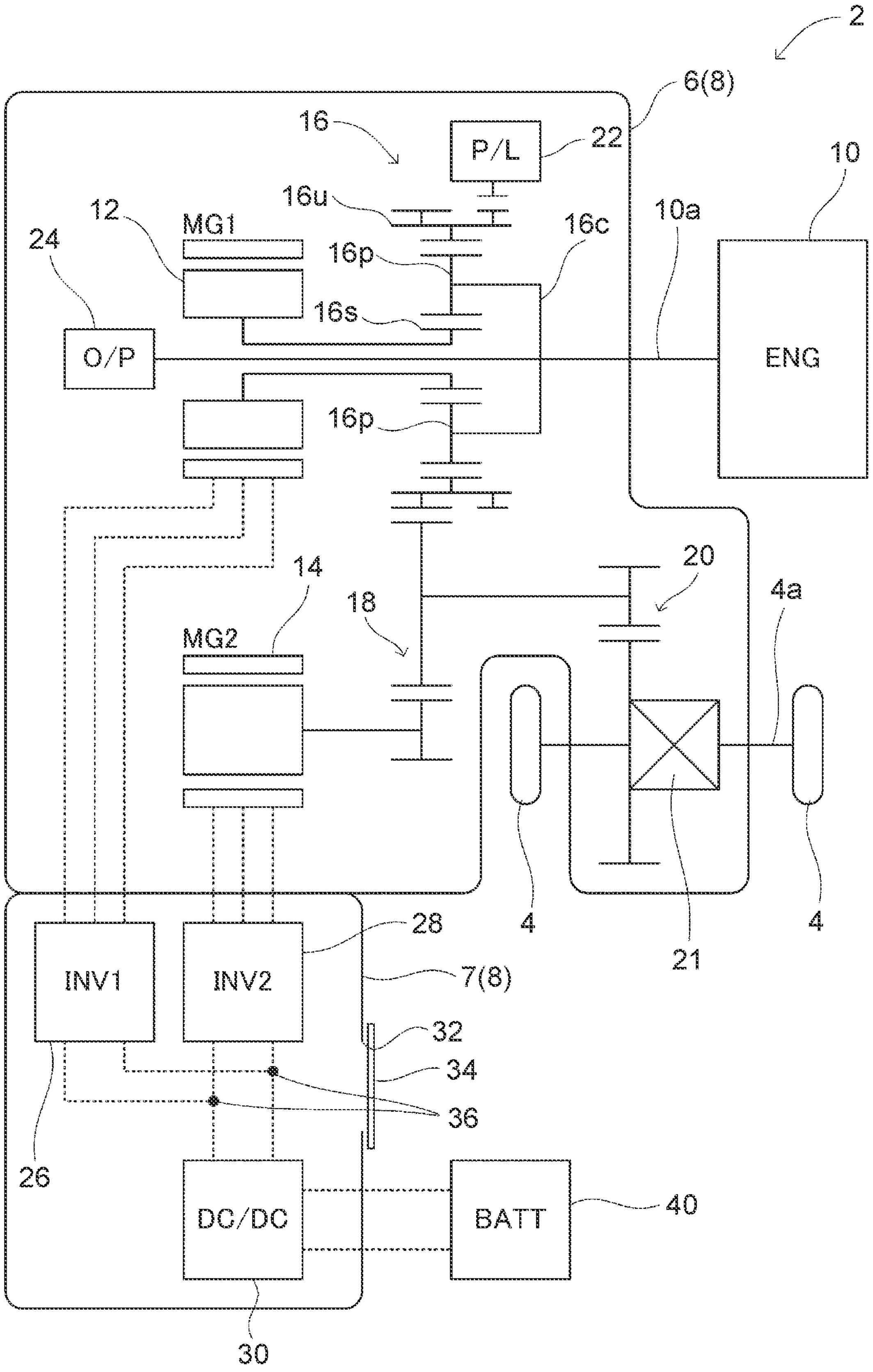
FIG. 2 is a diagram that schematically shows the configuration of the hybrid electric vehicle on which the hybrid unit is mounted.

A hydroelectric power generation system 50 of an embodiment will be described with reference to the accompanying drawings. As shown in FIG. 1, in the hydroelectric power generation system 50 of the present embodiment, a hybrid unit 8 removed from an end-of-life hybrid electric vehicle 2 is reused. Initially, the hybrid unit 8 of the hybrid electric vehicle 2 will be described with reference to FIG. 1 and FIG. 2. The hybrid unit 8 is a power unit connected to wheels 4 in the hybrid electric vehicle 2. The hybrid unit 8 includes a transaxle 6 and a power control unit 7. The transaxle 6 includes an engine shaft 10*a* connected to an engine 10, and a first motor generator 12 coupled to the engine shaft 10*a*. Thus, the first motor generator 12 is driven by the engine 10 to function as a generator.

The transaxle 6 further includes a second motor generator 14 and a planetary gear train 16. The planetary gear train 16 is located between the engine shaft 10*a* and the first motor generator 12. The engine shaft 10*a* is connected to the first motor generator 12 via the planetary gear train 16. The engine shaft 10*a* is also connected to the second motor generator 14 via the planetary gear train 16.

The planetary gear train 16 includes a sun gear 16*s*, a plurality of planetary gears 16*p*, a planetary carrier 16*c*, and an outer ring gear 16*u*. The sun gear 16*s* is connected to the first motor generator 12. The planetary gears 16*p* are disposed around the sun gear 16*s* and meshed with the sun gear 16*s*. The planetary carrier 16*c* supports the planetary gears 16*p* such that the planetary gears 16*p* are rotatable. The planetary carrier 16*c* is connected to the engine shaft 10*a*. The outer ring gear 16*u* is located around the planetary gears 16*p* and meshed with the planetary gears 16*p*. The outer ring gear 16*u* is connected to the second motor generator 14 via a first speed reduction mechanism 18. The outer ring gear 16*u* is connected to axles 4*a* of the wheels 4 via a second speed reduction mechanism 20. A differential gear 21 is provided between the second speed reduction mechanism 20 and the axles 4*a*.

The transaxle 6 further includes a parking lock 22. The parking lock 22 is capable of disabling the rotation of the outer ring gear 16*u* when, for example, the hybrid electric vehicle 2 has been parked. Thus, unintentional rotation of the wheels 4, that is, movement of the hybrid electric vehicle 2, during parking is disabled.

The transaxle 6 further includes an oil pump 24. The oil pump 24 is coupled to the engine shaft 10*a* and is driven by the rotation of the engine shaft 10*a*. The oil pump 24 is driven by the rotation of the engine shaft 10*a* to circulate lubricating oil in the transaxle 6.

The power control unit 7 is combined with the transaxle 6. The power control unit 7 includes a first inverter 26, a second inverter 28, and a DC-DC converter 30. The first inverter 26 is electrically connected to the first motor generator 12. The second inverter 28 is electrically connected to the second motor generator 14. The DC-DC converter 30 is electrically connected to the first motor generator 12 via the first inverter 26 and is electrically connected to the second motor generator 14 via the second inverter 28.

A battery 40 of the hybrid electric vehicle 2 is electrically connected to the DC-DC converter 30. The battery 40 has, for example, a plurality of lithium ion cells and is configured to be rechargeable. In the hybrid electric vehicle 2, the DC-DC converter 30 is able to step up direct-current power from the battery 40 and supply the direct-current power to the first inverter 26 and the second inverter 28. The first inverter 26 is able to convert direct-current power from the DC-DC converter 30 to alternating-current power and supply the alternating-current power to the first motor generator 12. Thus, the first motor generator 12 is able to operate on electric power supplied from the battery 40 to, for example, start the engine 10. Similarly, the second inverter 28 is able to convert direct-current power from the DC-DC converter 30 to alternating-current power and supply the alternating-current power to the second motor generator 14. Thus, the second motor generator 14 is able to operate on electric power supplied from the battery 40 to, for example, drive the wheels 4.

As described above, the first motor generator 12 is driven by the engine 10 to function as a generator. In this case, the first inverter 26 converts alternating-current power from the first motor generator 12 to direct-current power and supplies the direct-current power to the DC-DC converter 30. Then, the DC-DC converter 30 is able to step down direct-current power from the first inverter 26 and supply the direct-current power to the battery 40. On the other hand, the second motor generator 14 is able to function as a generator to use regenerative braking in the hybrid electric vehicle 2. In this case, the second inverter 28 converts alternating-current power from the second motor generator 14 to direct-current power and supplies the direct-current power to the DC-DC converter 30. Then, the DC-DC converter 30 is able to step down direct-current power from the second inverter 28 and supply the direct-current power to the battery 40.

The housing of the power control unit 7 includes a service hole 32 and a service cover 34 detachably attached to the service hole 32. The service hole 32 is configured to expose connection terminals 36 between the first inverter 26 and the DC-DC converter 30.

Figure 3:
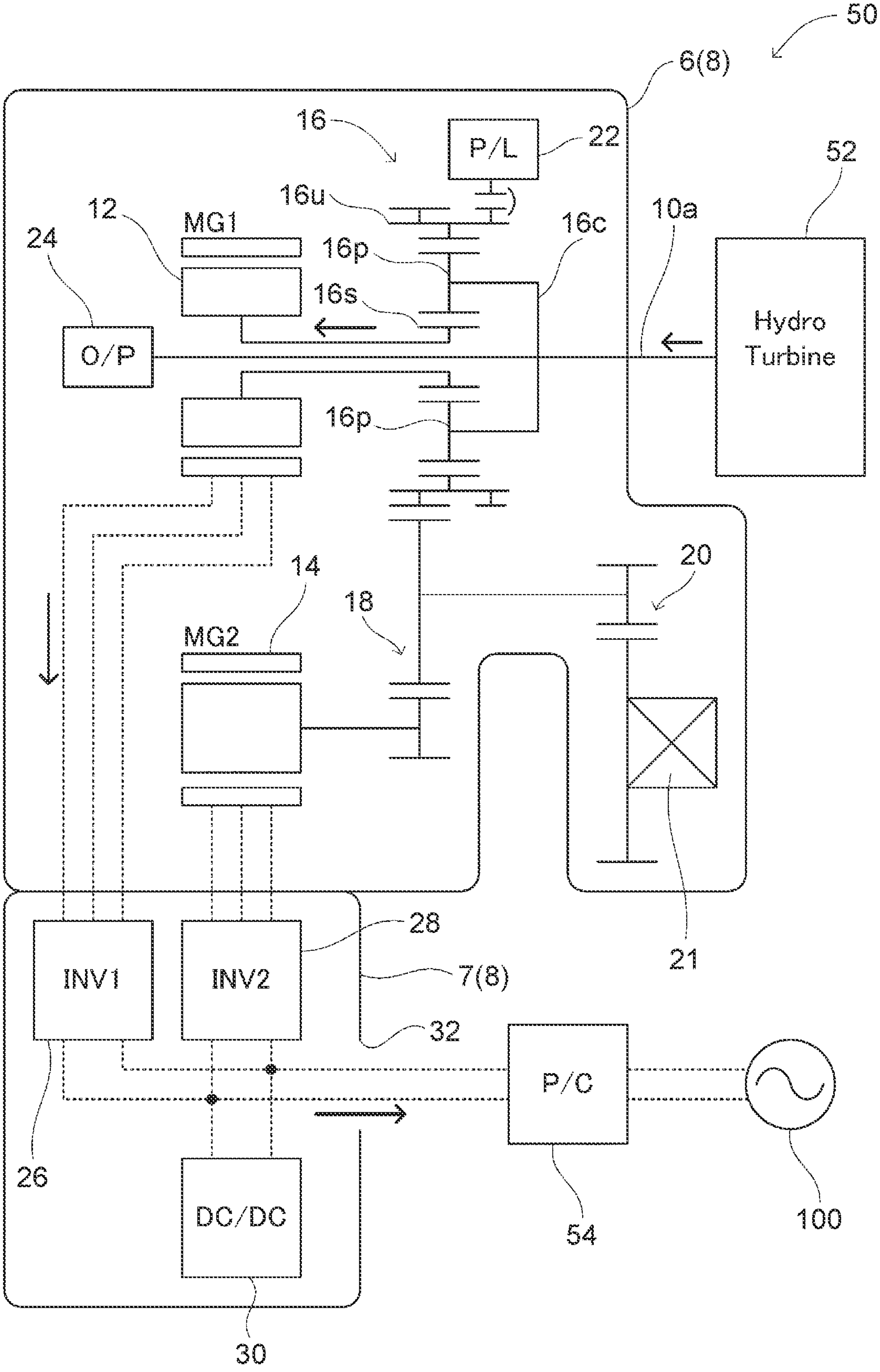
FIG. 3 is a diagram that schematically shows the configuration of a hydroelectric power generation system in which the hybrid unit is reused.

Next, the hydroelectric power generation system 50 for which the hybrid unit 8 is reused will be described with reference to FIG. 1 and FIG. 3. The hydroelectric power generation system 50 includes a hydraulic turbine 52 and a power conditioner 54 in addition to the hybrid unit 8. The hydraulic turbine 52 is assembled to the engine shaft 10*a* of the transaxle 6. The power conditioner 54 is connected to the power control unit 7 and is interposed between an external electric power system 100 and the power control unit 7.

When the hydroelectric power generation system 50 is manufactured, initially, the hybrid unit 8 is removed from the end-of-life hybrid electric vehicle 2. Subsequently, in the removed hybrid unit 8, the hydraulic turbine 52 is assembled to the engine shaft 10*a* of the transaxle 6. The power conditioner 54 is electrically connected to the power control unit 7. An electrical storage device may be connected to the power control unit 7 instead of or in addition to the power conditioner 54.

In the hydroelectric power generation system 50, the rotation of the hydraulic turbine 52 is input to the engine shaft 10*a* of the transaxle 6. The engine shaft 10*a* rotates together with the hydraulic turbine 52. The rotation of the engine shaft 10*a*, is transmitted to the first motor generator 12 via the planetary gear train 16, and the first motor generator 12 functions as a generator. At this time, the parking lock 22 is in an activated state, and power generation by the first motor generator 12 is not performed. Electric power generated by the first motor generator 12 is supplied to the power conditioner 54 via the power control unit 7. The power conditioner 54 coordinates with the external electric power system 100 to make it possible to supply electric power generated by the first motor generator 12 to the external electric power system 100. Where necessary, a speed reduction gear, a speed increasing gear, or a transmission may be provided between the hydraulic turbine 52 and the engine shaft 10*a*.

As described above, in the hydroelectric power generation system 50 of the present embodiment, the hybrid unit 8 mounted on the end-of-life hybrid electric vehicle 2 is reused as part of the hydroelectric power generation system 50. In recent years, with proliferation of hybrid electric vehicles 2, the number of hybrid electric vehicles 2 to be scrapped has also been increasing. Therefore, among various vehicles 2 to be scrapped, particularly reusing components of hybrid electric vehicles 2 has a significant meaning in effective use of resources. Also, in hybrid electric vehicles 2 to be scrapped, particularly, the hybrid units 8 mostly can sufficiently function over a long period of time. By reusing such hybrid units 8, hydroelectric power generation systems 50 can be provided at low cost, so it is possible to promote further proliferation of renewable energy.

In the hydroelectric power generation system 50 of the present embodiment, the parking lock 22 is provided in the transaxle 6. Therefore, when the hydroelectric power generation system 50 generates electricity, the parking lock 22 is able to be activated to limit components that operate inside the transaxle 6. Thus, it is possible to reduce energy loss in the transaxle 6. It is also possible to suppress the degradation of the transaxle 6. As another embodiment, when the hydroelectric power generation system 50 generates electricity, the parking lock 22 may be released, or power generation may be performed by the second motor generator 14 instead of or in addition to the first motor generator 12.

In the hydroelectric power generation system 50 of the present embodiment, the hydraulic turbine 52 is assembled to the engine shaft 10*a* of the transaxle 6. With such a configuration, the engine shaft 10*a* rotates together with the hydraulic turbine 52 to make it possible to drive the oil pump 24 by the rotation of the engine shaft 10*a*. As another embodiment, the hydraulic turbine 52 is not limited to being assembled to the engine shaft 10*a* and may be assembled to another rotary shaft coupled to the first motor generator 12 or the second motor generator 14, such as the axle 4*a* of the transaxle 6.

Here, in the hydroelectric power generation system 50 of the present embodiment, not limited to the overall hybrid unit 8 including the transaxle 6 and the power control unit 7, only the transaxle 6 may be used. The transaxle 6 just needs to include at least the first motor generator 12 and does not necessarily include other components, such as the second motor generator 14, the planetary gear train 16, the parking lock 22, and the oil pump 24.

The embodiments of the technology have been described in detail above; however, these are only illustrative and are not intended to limit the appended claims. The technology described in the appended claims also encompasses various modifications and changes from the specific examples illustrated above. The technical elements described in the specification or the drawings exhibit technical usability solely or in various combinations and are not limited to combinations of the appended claims at the time of filing the application.

The technology illustrated in the specification and drawings can achieve multiple purposes at the same time and has technical usability by achieving one of those purposes.

What is claimed is:

1. A manufacturing method for a hydroelectric power generation system, the manufacturing method comprising:

removing a hybrid unit from an end-of-life hybrid electric vehicle to reuse the hybrid unit in the hydroelectric power generation system, the hybrid unit including a transaxle and a power control unit combined with the transaxle, the transaxle including a first motor generator and a second motor generator, the hydroelectric power generation system including a power conditioner assembling a hydraulic turbine to a rotary shaft coupled to the first motor generator and the second motor generator in the removed transaxle; and connecting the first motor generator and the second motor generator to the power conditioner of the hydroelectric power generation system such that electric power generated by the first motor generator and the second motor generator is supplied to the power conditioner of the hydroelectric power generation system.

2. The manufacturing method according to claim 1, wherein the rotary shaft of the transaxle is an engine shaft connected to an engine of the hybrid electric vehicle when the transaxle is mounted on the hybrid electric vehicle, and wherein the manufacturing method includes assembling the hydraulic turbine to the engine shaft.

3. The manufacturing method according to claim 2, wherein:

the transaxle further includes a planetary gear train; and the rotary shaft is connected to the first motor generator and the second motor generator via the planetary gear train.

4. The manufacturing method according to claim 3, wherein the planetary gear train includes a sun gear connected to the first motor generator, a plurality of planetary gears meshed with the sun gear, a planetary carrier supporting the plurality of planetary gears and connected to the rotary shaft, and an outer ring gear meshed with the plurality of planetary gears and connected to the second motor generator.

5. The manufacturing method according to claim 4, wherein the transaxle further includes a parking lock configured to disable rotation of the outer ring gear.

6. The manufacturing method according to claim 1, wherein, the transaxle further includes an oil pump configured to be driven by rotation of the rotary shaft, and the oil pump is connected to the hydraulic turbine via the rotary shaft.

7. The manufacturing method according to claim 1, wherein:

the power control unit includes a first inverter electrically connected to the first motor generator, a second inverter electrically connected to the second motor generator, and a DC-DC converter electrically connected to the first motor generator via the first inverter and electrically connected to the second motor generator via the second inverter; and in the connecting, the first motor generator and the second motor generator are connected to the power conditioner of the hydroelectric power generation system via the first inverter and the second inverter without intervening the DC-DC converter.

8. The manufacturing method according to claim 7, wherein, the power control unit includes a housing provided with a service hole and a service cover detachably attached to the housing to cover the service hole, and the first motor generator and the second motor generator are connected to the power conditioner of the hydroelectric power generation system by wiring the first inverter and the second inverter to the power conditioner via the service hole provided in the housing.

9. The manufacturing method according to claim 1, further comprising connecting the power conditioner of the hydroelectric power generation system to an external electric power system of the hydroelectric power generation system.

* * * * *